US010332112B2

(12) United States Patent
Jones et al.

(10) Patent No.: US 10,332,112 B2
(45) Date of Patent: Jun. 25, 2019

(54) AUTHENTICATION FOR TRANSACTIONS USING NEAR FIELD COMMUNICATION

(75) Inventors: Andrew R. Jones, Round Rock, TX (US); Mauro Marzorati, Lutz, FL (US); Brian M. O'Connell, Cary, NC (US); Herbert D. Pearthree, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 13/431,138

(22) Filed: Mar. 27, 2012

(65) Prior Publication Data

US 2013/0262305 A1    Oct. 3, 2013

(51) Int. Cl.
*G06Q 20/40* (2012.01)
*H04B 5/00* (2006.01)
*G06Q 20/32* (2012.01)

(52) U.S. Cl.
CPC ... *G06Q 20/40145* (2013.01); *G06Q 20/3278* (2013.01); *G06Q 20/405* (2013.01); *H04B 5/0031* (2013.01)

(58) Field of Classification Search
None
See application file for complete search history.

(56) References Cited

U.S. PATENT DOCUMENTS

| | | | | |
|---|---|---|---|---|
| 8,646,034 B2 * | 2/2014 | Murakami | ............ | G06F 9/4401 455/41.1 |
| 8,880,055 B1 * | 11/2014 | Clement | ............ | G06Q 20/3278 455/410 |
| 2001/0049785 A1 * | 12/2001 | Kawan | ............... | G06Q 20/3674 713/156 |
| 2003/0177361 A1 * | 9/2003 | Wheeler | ................. | G06F 21/32 713/176 |
| 2008/0201212 A1 | 8/2008 | Hammad et al. | | |
| 2008/0275349 A1 * | 11/2008 | Halperin | .............. | A61B 5/0205 600/484 |

(Continued)

OTHER PUBLICATIONS

Atallah et al., "Secure Biometric Authentication for Weak Computational Devices" Proceedings of Financial Cryptography and Data Security Conference (FC '05), 2005 [online], [retrieved on Dec. 12, 2011]. Retrieved from the Internet <URL: http://citeseerx.ist.psu.edu/viewdoc/download?doi=10.1.1.112.282&rep=rep1&type=pdf>.

(Continued)

*Primary Examiner* — Robert R Niquette
*Assistant Examiner* — William J Jacob
(74) *Attorney, Agent, or Firm* — Edward P. Li (57) ABSTRACT

In a method for authenticating a current user of a near field communication (NFC) device, a profile for an authorized user of the NFC device is established based on data received from one or more sensors of the NFC device over a first period of time. Responsive to a request for a payment transaction, a profile for the current user of the NFC device is established based on data received from the one or more sensors over a second period of time after the first period of time. The profile for the current user is compared with the profile for the authorized user. A determination is made as to whether one or more values in the profile for the current user are within a range of one or more values in the profile for the authorized user at a confidence level.

15 Claims, 4 Drawing Sheets

(56) References Cited

U.S. PATENT DOCUMENTS

| | | | |
|---|---|---|---|
| 2009/0319784 A1 | 12/2009 | Faith et al. | |
| 2011/0165836 A1* | 7/2011 | Dixon | G06Q 20/045 455/41.1 |
| 2011/0174874 A1 | 7/2011 | Poznansky et al. | |
| 2011/0187642 A1* | 8/2011 | Faith | G06F 1/1694 345/158 |
| 2012/0094598 A1* | 4/2012 | Tysowski | H04W 4/001 455/41.1 |
| 2012/0246074 A1* | 9/2012 | Annamalai | G01S 1/68 705/44 |
| 2013/0020389 A1* | 1/2013 | Barnett | G06Q 20/204 235/380 |
| 2013/0198056 A1* | 8/2013 | Aldrey | G06Q 30/018 705/38 |
| 2013/0282580 A1* | 10/2013 | O'Brien | G06Q 20/4014 705/44 |
| 2015/0205550 A1* | 7/2015 | Lee et al. | G06F 3/12 |
| 2015/0264572 A1* | 9/2015 | Turgeman | H04W 12/06 455/411 |

OTHER PUBLICATIONS

Bazin et al., "Gait Verification Using Probabilistic Methods" Proceedings of the Seventh IEEE Workshop on Applications of computer Vision (WACV/MOTION '05), Jan. 5-7, 2005 [online], [retrieved on Dec. 19, 2011]. Retrieved from the Internet <URL: http://ieeexplore.ieee.org/stamp/stamp.jsp?tp=&arnumber=4129460>.

Bouchrika et al., "Gait Recognition by Dynamic Cues" 19th International Conference on Pattern Recognition 2008, IPCR 2008, Dec. 8-11, 2008 [online], [retrieved on Dec. 12, 2011]. Retrieved from the Internet <URL: http://ieeexplore.ieee.org/stamp/stamp.jsp?tp=&arnumber=4760994&isnumber=4760915>.

Delac et al., "A Survey of Biometric Recognition Methods" 46th International Symposium Electronics in Marine, Elmar-2004, Jun. 16-18, 2004 [online], [retrieved on Dec. 12, 2011]. Retrieved from the Internet <URL: http://ieeexplore.ieee.org/stamp/stamp.jsp?tp=&arnumber=1356372>.

Gafurov et al., "Biometric Gait Authentication Using Accelerometer Sensor" Journal of Computers, vol. 1, No. 7, Oct./Nov. 2006, Academy Publisher [online], [retrieved on Dec. 12, 2011]. Retrieved from the Internet <URL: http://citeseerx.ist.psu.edu/viewdoc/download?doi=10.1.1.92.6516&rep=rep1&type=pdf>.

Iwashita et al., "Person Identification from Human Walking Sequences Using Affine Moment Invariants" 2009 IEEE International Conference on Robotics and Automation, Kobe, Japan, May 12-17, 2009 [online], [retrieved on Dec. 12, 2011]. Retrieved from the Internet <URL: http://ieeexplore.ieee.org/stamp/stamp.jsp?arnumber=05152485>.

Kawatsura et al., "Payment Application Programmers Interface (API) for v1.0 Internet Open Trading Protocol (IOTP) (RFC3867)", Nov. 6, 2004, IP.com [online], [retrieved on Oct. 15, 2011]. Retrieved from: Prior Art Database, IP.com No. IPCOM000032482D.

Kunze et al., "Using Acceleration Signatures from Everyday Activities for On-body Device Location" Embedded Systems Lab (ESL), University of Passau [online], [retrieved on Dec. 12, 2011]. Retrieved from the Internet <URL: http://citeseerx.ist.psu.edu/viewdoc/download?doi=10.1.1.69.5338&rep=rep1&type=pdf>.

Mims, "Smart Phones that Know Their Users by How They Walk" Technology Review Published by MIT, Sep. 16, 2010 [online], [retrieved on Dec. 12, 2011]. Retrieved from the Internet <URL: http://www.technologyreview.com/blog/mimssbits/25767/>.

Nirkhe, "Contact-less Payment Solution Using NFC Technology in Mobile Cell Phone Device", Mar. 30, 2011, IP.com [online], [retrieved on Oct. 15, 2011]. Retrieved from: Prior Art Database, IP.com No. IPCOM000205538D.

Sprager et al., "Gait Identification Using Cumulants of Accelerometer Data", Proceedings of the 2nd WSEAS International Conference on Sensors, and Signals and Visualization, Imaging and Simulation and Materials Science, SENSIG'09/VIS'09/MATERIALS'09, 2009 [online], [retrieved on Dec. 12, 2011]. Retrieved from the Internet <URL: http://www.wseas.us/e-library/conferences/2009/baltimore/MAVISE/MAVISE-14.pdf>.

Terrier et al., "How Useful is Satellite Positioning System (GPS) to Track Gait Parameters? A Review" Journal of NeuroEngineering and Rehabilitation, Published: Sep. 2, 2005 [online], [retrieved on Dec. 12, 2011]. Retrieved from the Internet <URL: http://www.ncbi.nlm.nih.gov/pmc/articles/PMC1224864/>.

* cited by examiner

AUTHENTICATION FOR TRANSACTIONS USING NEAR FIELD COMMUNICATION

TECHNICAL FIELD

The present invention relates generally to financial transaction security, and more particularly to authentication in financial transactions in which near field communication (NFC) is used.

BACKGROUND

Near field communication (NFC) is a technology based on radio frequency identification (RFID). NFC is used to exchange small amounts of data between two NFC devices or between an NFC device and an NFC reader. One exemplary NFC device is an NFC-enabled mobile phone. NFC is a standards-based, short-range (a few centimeters, typically requiring a distance of 4 cm or less) wireless connectivity technology that enables simple two-way short-range communication between electronic devices. This short-range communication is based on inductive-coupling, where loosely coupled inductive circuits share power and data over a distance of a few centimeters. More specifically, near field communication (NFC) involves an initiator and a target. The initiator actively generates a radio frequency (RF) field that can power a passive target. This enables NFC targets to take very simple form factors such as tags, stickers, key fobs, or cards that do not require batteries. Where two NFC devices are powered, NFC peer-to-peer communication is also possible.

Applications of NFC include contactless transactions, data exchange, and simplified setup of more complex communications such as Wi-Fi. For example, a user may utilize an NFC-enabled device to access services, interact with content, set up connections, make a payment, or present a ticket.

NFC tags store data and are typically read-only, although in some instances, they may be rewriteable. NFC tags can be custom-encoded by their manufacturers or use the specifications provided by the NFC Forum, an industry association promoting the technology and setting key standards. The tags can securely store personal data such as debit and credit card information, loyalty program data, personal identification numbers (PINs), and networking contacts, among other information. The NFC Forum defines four types of tags which provide different communication speeds and capabilities in terms of configurability, memory, security, data retention and write endurance. Tags currently offer between 96 and 512 bytes of memory.

A standard authentication procedure for every transaction using an NFC device may include entering a PIN via a keyboard or a keypad, voice recognition identification of one or more voices, biometric identification, or identification via a connection to a remote device.

SUMMARY

Embodiments of the present invention provide a method for authenticating a current user of a near field communication (NFC) device. The method includes the step of one or more processors establishing a profile for an authorized user of the NFC device based on data received from one or more sensors of the NFC device over a first period of time. The method further includes the step of the one or more processors establishing, responsive to a request for transaction date, a profile for the current user of the NFC device based on data received from the one or more sensors over a second period of time after the first period of time. The method further includes the step of the one or more processors comparing the profile for the current user with the profile for the authorized user. And, the method further includes the step of the one or more processors determining whether one or more values in the profile for the current user are within a range of one or more values in the profile for the first user at a confidence level.

Embodiments of the present invention provide a computer program product for authenticating a current user of a near field communication (NFC) device. The computer program product includes one or more computer-readable tangible storage devices and program instructions stored on at least one of the one or more tangible storage devices. The program instructions include program instructions to establish a profile for an authorized user of the NFC device based on data received from one or more sensors of the NFC device over a first period of time. The program instructions further include program instructions to, responsive to a request for transaction data, establish a profile for the current user of the NFC device based on data received from the one or more sensors over a second period of time after the first period of time. The program instructions further include program instructions to compare the profile for the current user with the profile for the authorized user. And, the program instructions further include program instructions to determine whether one or more values in the profile for the current user are within a range of one or more values in the profile for the second user at a confidence level.

Embodiments of the present invention provide a near field communication (NFC) device. The NFC device includes one or more sensors, one or more processors, one or more computer-readable memories, one or more computer-readable tangible storage devices, and program instructions stored on at least one of the one or more storage devices for execution by at least one of the one or more processors. The program instructions include program instructions to establish a profile for an authorized user of the NFC device based on data received from the one or more sensors of the NFC device over a first period of time. The program instructions further include program instructions to, responsive to a request for transaction data, establish a profile for a current user of the NFC device based on data received from the one or more sensors over a second period of time after the first period of time. The program instructions further include program instructions to compare the profile for the current user with the profile for the authorized user. And, the program instructions further include program instructions to determine whether one or more values in the profile of the current user are within a range of one or more values in the profile for the authorized user at a confidence level.

DETAILED DESCRIPTION

Embodiments of the present invention recognize that using a standard authentication procedure during payment transactions over near field communications impedes the convenience and efficiency that an NFC device allows. Embodiments of the present invention accordingly provide for passively authenticating users of NFC devices without user intervention.

Figure 1:
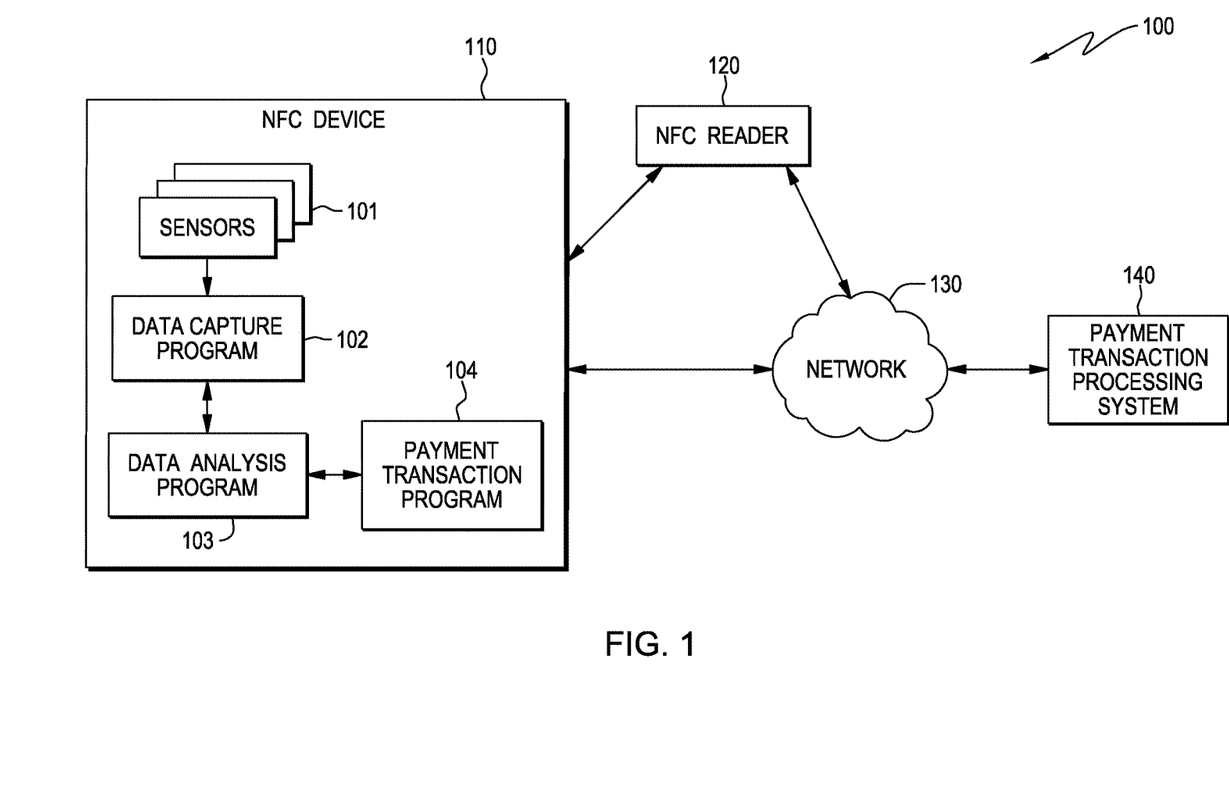
FIG. 1 is a block diagram illustrating a distributed data processing environment in which a near field communication (NFC) device is used for payment transactions, in accordance with an embodiment of the present invention.

FIG. 1 is a block diagram illustrating a distributed data processing environment 100 in which a near field communication (NFC) device 110 is used for payment transactions, in accordance with one embodiment of the present invention. Distributed data processing environment 100 comprises NFC device 110, an NFC reader 120, a network 130, and a payment transaction processing system 140. NFC device 110 and NFC reader 120 are connected to payment transaction processing system 140 by network 130.

In preferred embodiments, when NFC device 110 and NFC reader 120 are contacted or in proximity with each other, communication between NFC device 110 and NFC reader 120 is established. NFC device 110 sends transaction data through NFC reader 120 and network 130 to payment transaction processing system 140 (which is a computer system of a bank, a credit card issuer, or any other transaction processing party). Alternatively, NFC device 110 may send transaction data directly to payment transaction processing system 140 through network 130. Payment transaction processing system 140 sends a confirmation to NFC reader 120 through network 130 and further to NFC device 110 through NFC reader 120. As an alternative, payment transaction processing system 140 may send a transaction response directly to NFC device 110 through network 130.

In a preferred embodiment, NFC device 110 is an NFC-enabled mobile phone. In other embodiments, NFC device 110 may be an NFC-enabled tablet computer, an NFC-enabled personal digital assistant (PDA), or any NFC-enabled mobile computing device. NFC device 110 comprises a plurality of sensors 101, a data capture program 102 to acquire data from one or more of sensors 101, a data analysis program 103 to analyze the acquired data and generate authorized user and current user profiles, and a payment transaction program 104 to authenticate a current user of NFC device 110 and to send payment transaction data to payment transaction processing system 140. In other embodiments of the present invention, two or more of data capture program 102, data analysis program 103, and payment transaction program 104 are combined into a single program.

Sensors 101 may include a GPS receiver or GPS speed sensor. The GPS receiver or GPS speed sensor collect and/or calculate real-time latitude, longitude, time, speed, and/or heading. The method of speed calculation with the GPS receiver or GPS speed sensor is to consider a series of positions (i.e. latitude and longitude) determined by the GPS receiver or GPS speed sensor at regular time intervals; speed values are computed from the series of the positions. An alternative method of speed calculation with the GPS receiver or GPS speed sensor is to compute a Doppler shift in pseudo range signals from satellites utilized by the GPS receiver or GPS speed sensor.

Sensors 101 may also include an accelerometer that measures the rate of change of the velocity of NFC device 110 relative to any inertial frame of reference. Sensors 101 may further include a gyroscope. The gyroscope is capable of calculating orientation and rotation of NFC device 110, thus allowing for more accurate recognition of movement within a 3D space than a lone accelerometer in NFC device 110.

Data capture program 102 captures data received from one or more of sensors 101. Data capture program 102 can also classify received accelerometer measurement data and received gyroscopic movement data into different speed intervals. For example, the different speed intervals may be 0 mph for idle, 0.5-3 mph for walking, and 5-70 mph for driving.

Data analysis program 103 uses data captured by data capture program 102 during use of NFC device 110 by an authorized user of NFC device 110 to establish a profile for the authorized user. Data analysis program 103 also uses data captured by data capture program 102 and not used to establish the profile for the authorized user to establish a profile for a current user of NFC device 110.

Payment transaction program 104 interfaces with data analysis program 103 in two ways. Payment transaction program 104 requests data analysis program 103 to provide the profile for the authorized user in response to payment transaction program 104 receiving a request for transaction data. Payment transaction program 104 then requests data analysis program 103 to provide the profile for the current user. Payment transaction program 104 compares the profile for the current user with the profile for the authorized user. In exemplary embodiments, payment transaction program 104 compares the profile for the current user with the profile for the authorized user by comparing one or more values in the profiles and determining whether the one or more values in the profile for the current user are within ranges of the one or more values in the profile for the authorized user at a confidence level. Payment transaction program 104 requires one or more additional authentication means if the one or more values in the profile for the current user are not within ranges of the one or more values in the profile for the authorized user at the confidence level. The additional authentication means can include but are not limited to facial recognition, fingerprint scanning, retina scanning, PIN number entry, and password entry. These additional authentication means may be part of NFC device 110 or part of another system (e.g. a retailer's point-of-sale system). If the one or more values in the profile for the current user are within ranges of the one or more values in the profile for the authorized user at the confidence level, payment transaction program 104 sends payment transaction data to payment transaction processing system 140.

In a preferred embodiment, data capture program 102, data analysis program 103, and payment transaction program 104 are implemented on NFC device 110. In another embodiment, data analysis program 103 and payment transaction program 104 can be implemented in a distributed system in a network as a service offered to retailers, the authorized user, credit card companies, and/or third parties who secure and verify transactions. For example, data analysis program 103 can be a component that is run on a remote system that is owned by the cellular carrier of NFC device 110 or by the credit card company of the authorized user of NFC device 110.

Figure 2:
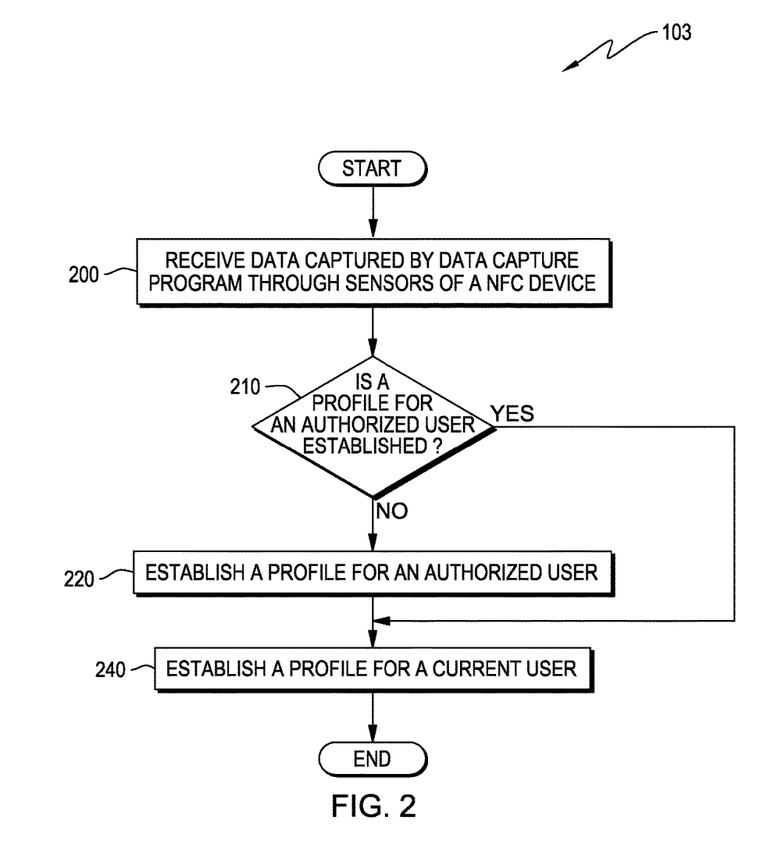
FIG. 2 is a flowchart illustrating operational steps of establishing profiles for an authorized user and a current user of the NFC device, in accordance with an embodiment of the present invention.

FIG. 2 is a flowchart illustrating operational steps of establishing the profiles for the authorized user and the current user of NFC device 110, in accordance with an embodiment of the present invention. In step 200, data analysis program 103 receives data captured by data capture program 102 through one or more of sensors 101 of NFC device 110. Data capture program 102 can capture the data from the one or more of sensors 101 either on a periodic or a random schedule. In the periodic schedule, the time interval or frequency of data capture may be defined by a system developer, the authorized user, or both. The received sensor data can include, but are not limited to, data indicating a speed that NFC device 110 is traveling, accelerometer measurement data, gyroscopic movement data, or any combination thereof.

Data analysis program 103 determines whether a profile for an authorized user of NFC device 110 is established (decision 210). If data analysis program 103 determines that the profile for authorized user of NFC device 110 is not established (no branch of decision 210), in step 220, data analysis program 103 uses data captured by data capture program 102 to establish a profile for an authorized user of NFC device 110. In exemplary embodiments, data analysis program 103 uses data captured by data capture program 102 during use of NFC device 110 by the authorized user to calculate one or more of the following values that characterize use of NFC device 110 by the authorized user: walking speed, time periods or durations during which NFC device 110 is not moving (i.e. how long the authorized user stops walking to look at products), gaits, speed of direction changes, acceleration and deceleration rates, ways that NFC device 110 is carried (e.g. placing in a pocket or carrying on a hip), average walking speed÷ average speed of direction changes. In exemplary embodiments, data analysis program 103 includes the one or more calculated values that characterize use of NFC device 110 by the authorized user in the profile for the authorized user.

While several types of calculated values for inclusion in the profile for the authorized user have been specified, one of skill in the art will recognize that many other values can be calculated and included in the profile authorized user, and that those other values are within the scope and spirit of the invention. Further, one of skill in the art will recognize that data analysis program 103 can use either a complex or a simple algorithm in calculating one or more values for inclusion in the profile of the authorized user, and that average walking speed÷ average speed of direction changes is but one example of a simple algorithm that can be used.

In exemplary embodiments, data analysis program 103 requires a certain amount of data prior to establishing the profile for the authorized user, and continually updates the profile for the authorized user over time. Data analysis program 103 determines the certain amount of data by calculating a sampling size required for a confidence level. After data capture program 102 captures the required amount of data for data analysis program 103 to establish the profile for the authorized user, payment transaction program 104 can utilize the established profile of the authorized user to authenticate a current user of NFC device 110. In exemplary embodiments, after data analysis program 103 establishes the profile for the authorized user, for the purpose of improving the confidence level, data analysis program 103 can use additional data captured by data capture program 102 to update the profile of the authorized user over time.

If data analysis program 103 determines that the profile for an authorized user of NFC device 110 is established (yes branch of decision 210), in step 240, data analysis program 103 uses data captured by data capture program 102 and not used to establish the profile for the authorized user to establish a profile for a current user of NFC device 110. In a preferred embodiment, data analysis program 103 uses data captured by data capture program 102 during a predefined period of time before a request for transaction data and not used to establish the profile for the authorized user. In exemplary embodiments, data analysis program 103 uses data captured by data capture program 102 and not used to establish the profile for the authorized user to calculate one or more of the following values that characterize use of NFC device 110 by the current user: walking speed, time periods or durations during which NFC device 110 is not moving (i.e. how long the current user stops walking to look at products), gaits, speed of direction changes, acceleration and deceleration rates, ways that NFC device 110 is carried (e.g. placing in a pocket or carrying on a hip), and average walking speed÷ average speed of direction changes. In exemplary embodiments, data analysis program 103 includes the one or more calculated values that characterize use of NFC device 110 by the current user in the profile for the current user. It should be noted that the calculated values in the profile for the authorized user and the calculated values in the profile for the current user only need to be accurate enough to verify whether the current user is the authorized user, not to select the authorized user among various other users.

While several types of calculated values for inclusion in the profile for the current user have been specified, one of skill in the art will recognize that many other values can be calculated and included in the profile current user, and that those other values are within the scope and spirit of the invention. Further, one of skill in the art will recognize that data analysis program 103 can use either a complex or a simple algorithm in calculating one or more values for inclusion in the profile of the current user, and that average walking speed÷ average speed of direction changes is but one example of a simple algorithm that can be used.

In exemplary embodiments, in establishing the authorized and/or current user profiles, data analysis program 103 gives different weights to the data received from data capture program 102. More weights will be given to data which are proven to provide more accurate information in identifying the authorized user or the current user. For example, the measurements of the accelerometer may be proven to provide more accurate information for identifying the authorized user than the measurements of speed; therefore, in calculating the one or more values of the authorized user profile, the measurements of the accelerometer may be given 3 times weight over the measurements of speed. The weights may also be defined dynamically on a per user basis based upon some criteria. For example, if a user generates very minimal changes in the measurements of the accelerometer, the measurements of speed may become more heavily weighted.

Figure 3:
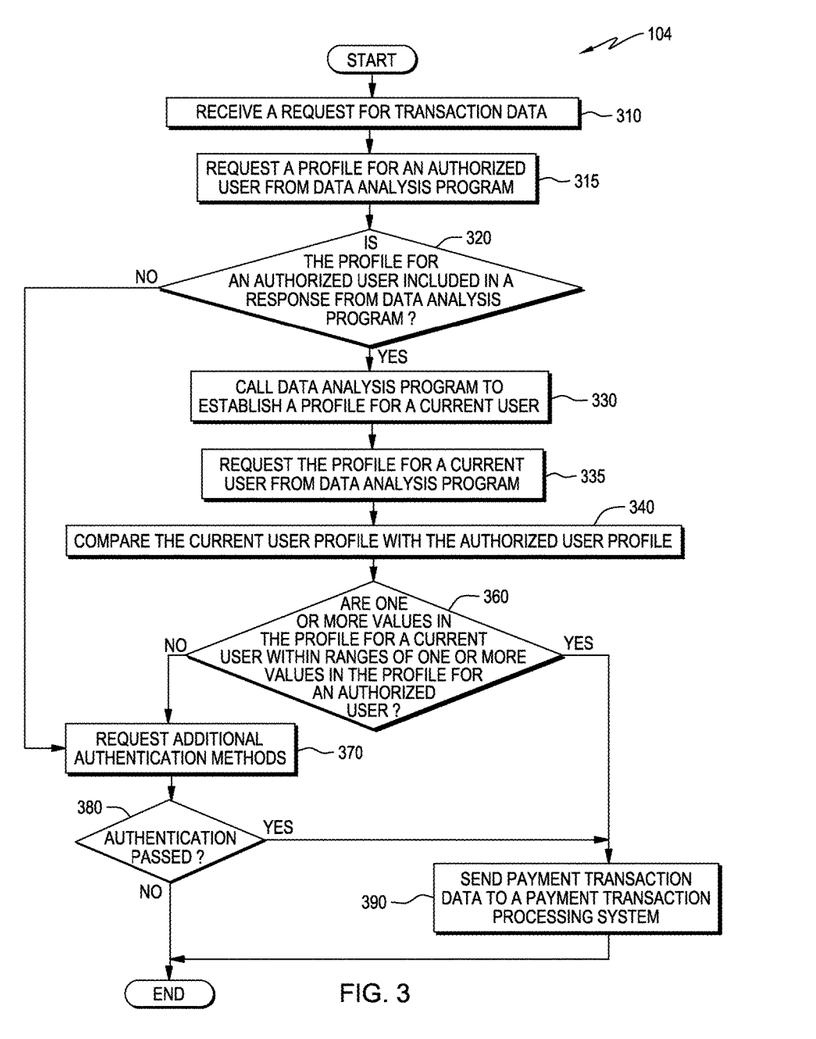
FIG. 3 is a flowchart illustrating operational steps of determining whether additional authentication is required for a payment transaction using the NFC device, in accordance with an embodiment of the present invention.

FIG. 3 is a flowchart illustrating operational steps of determining whether additional authentication is required for a payment transaction using NFC device 110, in accordance with an embodiment of the present invention. The current user of NFC device 110 may use NFC device 110 to make a purchase. Payment transaction program 104 receives a request for transaction data (step 310). Payment transaction program 104 requests the profile for the authorized user from data analysis program 103 (step 315). Payment transaction program 104 determines whether a response from data analysis program 103 includes the profile for the authorized user (decision 320). If payment transaction program 104 determines that the response from data analysis program 103 does not include the profile for the authorized user (no branch of decision 320), payment transaction program 104 requests the current user to use additional authentication methods (skipping steps 330, 335, 340, and 360, and going to step 370). If the profile for the authorized user has been established (yes branch of decision 320), payment transaction program 104 calls data analysis program 103 to establish the profile for the current user (step 330). Payment transaction program 104 then requests the profile for the current user from data analysis program 103 (step 335).

Payment transaction program 104 compares the profile for the current user with the profile for the authorized user (step 340). In exemplary embodiments, payment transaction program 104 compares the profile for the current user with the profile for the authorized user by comparing one or more values in the profiles and determining whether the one or more values in the profile for the current user are within ranges of the one or more values in the profile for the authorized user at a predefined confidence level. The predefined confidence level may be defined by a system developer, the authorized user, a credit card company, a retailer, or any other authorized party involved in the transaction.

In exemplary embodiments, either data analysis program 103 or payment transaction program 104 may dynamically adjust the confidence level based on a characteristic of the transaction. In one embodiment, an amount of money involved in the transaction is the characteristic. For example, for a lower amount of money in the transaction, the confidence level may be dynamically set lower; however, for a higher amount of money, the confidence level may be dynamically set higher.

If the one or more values in the profile for the current user are within ranges of the one or more values in the profile for the authorized user (yes branch of decision 360), payment transaction program 104 sends payment transaction data from NFC device 110 to payment transaction processing system 140 (step 390). If the one or more values in the profile for the current user are not within ranges of the one or more values in the profile for the authorized user (no branch of decision 360), payment transaction program 104 requests the current user to use additional authentication methods (step 370). The data of the additional authentication methods may be analyzed by NFC device 110, by a remote system that is owned by the cellular carrier of NFC device 110, or by the credit card company of the authorized user of NFC device 110.

Responsive to receiving the data of the additional authentication methods in step 370, payment transaction program 104 determines, based on the data received at step 370, whether the current user is the authorized user (decision 380). If payment transaction program 104 determines that the current user is the authorized user (yes branch of decision 380), payment transaction program 104 sends the payment transaction data from NFC device 110 to payment transaction processing system 140 (step 390). Otherwise (no branch of decision 380), the payment transaction data will not be sent. Alternatively, the functions of steps 370 and 380 in payment transaction program 104 may be part of another system (e.g. a retailer's point-of-sale system).

Figure 4:
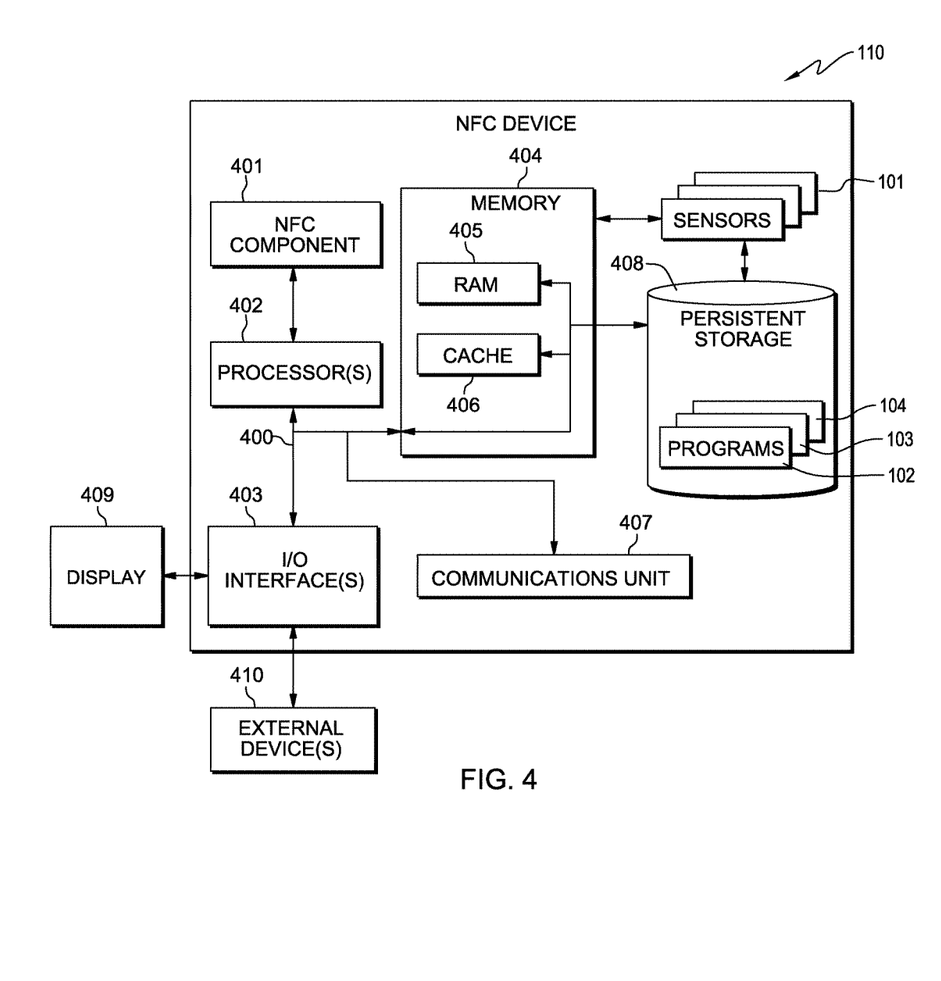
FIG. 4 is a block diagram illustrating hardware and software of the NFC device presented in FIG. 1, in accordance with an embodiment of the present invention.

FIG. 4 is a block diagram illustrating hardware and software within the NFC device presented in FIG. 1, in accordance with an embodiment of the present invention. It should be appreciated that FIG. 4 provides only an illustration of one implementation and does not imply any limitations with regard to the environment in which different embodiments may be implemented. Many modifications to the depicted environment may be made.

NFC device 110 includes communications fabric 400, which provides communications between an NFC component 401, sensors 101, processor(s) 402, memory 404, persistent storage 408, communications unit 407, and input/output (I/O) interface(s) 403.

Memory 404 may include, for example, one or more random access memories (RAM) 405, cache memory 406, or any other suitable volatile or non-volatile storage device. RAM 405, cache memory 406, and persistent storage 408 are examples of computer-readable tangible storage devices. A storage device is any piece of hardware that is capable of storing information, such as data, program code in functional form, and/or other suitable information, on a temporary basis and/or permanent basis.

Data capture program 102, data analysis program 103, and payment transaction program 104 are stored in persistent storage 408 for execution by processor(s) 402 via memory 404. In the embodiment illustrated in FIG. 4, persistent storage 408 includes flash memory. Persistent storage 408 may alternatively or additionally include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 407, in these examples, provides for communications with other devices. In these examples, communications unit 407 includes one or more network interface cards. Communications unit 407 may provide communications through the use of either or both physical and wireless communications links. In another embodiment still, NFC device 110 may be devoid of communications unit 407. Data capture program 102, data analysis program 103, and payment transaction program 104 may be downloaded to persistent storage 408 through communications unit 407.

I/O interface(s) 403 allows for input and output of data with other devices that may be connected to NFC device 110. For example, I/O interface(s) 403 may provide a connection to external device(s) 410 such as a camera, a mouse, a keyboard, a keypad, a touch screen, and/or some other suitable input device. I/O interface(s) 403 also connect to display 409.

Display 409 is a mechanism to display data to a user and may be, for example, a computer monitor. Alternatively, display 409 may be a display that is integral to NFC device 110 and may also function as a touch screen.

The aforementioned programs can be written in various programming languages (such as Java® or C++) including low-level, high-level, object-oriented or non object oriented languages. Alternatively, the functions of the aforementioned programs can be implemented in whole or in part by computer circuits and other hardware (not shown).

Based on the foregoing, a method, computer system, and computer program product have been disclosed for authentication in financial transactions using near field communication (NFC). However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. Therefore, the present invention has been disclosed by way of example and not limitation.

What is claimed is:

1. A method for authenticating a current user of a near field communication (NFC) device, the method comprising steps of:
   one or more processors of the NFC device establishing a profile comprising values of the movements of an authorized user of the NFC device based on data received from one or more sensors of the NFC device over a first period of time when the NFC device is carried by the authorized user, wherein in the profile the values of the movements of the authorized user include at least one of walking speed of the authorized user, time periods the NFC device carried by the authorized user does not move, gaits of the authorized user, speed of direction changes of the authorized user, acceleration and deceleration rates of the authorized user, and ways the NFC device is carried by the authorized user;
   responsive to a request for transaction data, the one or more processors of the NFC device establishing a profile comprising values of the movements of the current user of the NFC device based on data received from the one or more sensors of the NFC device over a second period of time when the NFC device is carried by the current user after the first period of time, wherein in the profile the values of the movements of the current user include at least one of walking speed of the current user, time periods the NFC device carried by the current user does not move, gaits of the current user, speed of direction changes of the current user, acceleration and deceleration rates of the current user, and ways the NFC device is carried by the current user;
   the one or more processors of the NFC device carried by the current user comparing the values of the movements of the authorized user with the values of the movements of the current user;
   the one or more processors of the NFC device carried by the current user determining whether the values of the movements of the current user are within a range of the values of the movements of the authorized user at a confidence level, wherein the confidence level is determined according to an amount of money in a transaction;
   responsive to determining that the values of the movements of the current user are within range of the values of the movements of the authorized user at the confidence level, the one or more processors of the NFC device carried by the current user sending the transaction data from the NFC device to a payment transaction processing system; and
   responsive to determining that the values of the movements of the current user are not within range of the values of the movements of the authorized user at the confidence level, the one or more processors of the NFC device carried by the current user requesting at least one of biometric data and manual input data as an additional authentication means from the current user of the NFC device.

2. The method of claim 1, further comprising the step of:
   in response to that the one or more processors of the NFC device carried by the current user requests the additional authentication means from the current user of the NFC device, the one or more processors of the NFC device receiving the additional authentication means from the current user of the NFC device.

3. The method of claim 1, wherein the biometric data includes facial recognition data, fingerprint scan data, or retinal scan data.

4. The method of claim 1, further comprising the step of:
   the one or more processors of the NFC device carried by the current user updating the confidence level over time in response to receiving additional data from the one or more sensors.

5. The method of claim 1, wherein the one or more sensors of the NFC device include a global positioning system (GPS) receiver, an accelerometer, or a gyroscope.

6. A computer program product for authenticating a current user of a near field communication (NFC) device, the computer program product comprising:
   one or more computer-readable tangible storage devices and program instructions stored on at least one of the one or more tangible storage devices, the program instructions comprising:
   program instructions to establish by the NFC device a profile comprising values of the movements of an authorized user of the NFC device based on data received from one or more sensors of the NFC device over a first period of time when the NFC device is carried by the authorized user, wherein in the profile the values of the movements of the authorized user include at least one of walking speed of the authorized user, time periods the NFC device carried by the authorized user does not move, gaits of the authorized user, speed of direction changes of the authorized user, acceleration and deceleration rates of the authorized user, and ways the NFC device is carried by the authorized user;
   program instructions to, responsive to a request for transaction data, establish a profile comprising values of the movements of the current user of the NFC device based on data received from the one or more sensors of the NFC device over a second period of time when the NFC device is carried by the current user after the first period of time, wherein in the profile the values of the movements of the current user include at least one of walking speed of the current user, time periods the NFC device carried by the current user does not move, gaits of the current user, speed of direction changes of the current user, acceleration and deceleration rates of the current user, and ways the NFC device is carried by the current user;
   program instructions to compare by the NFC device carried by the current user the values of the movements of the current user with the values of the movements of the authorized user;
   program instructions to determine by the NFC device carried by the current user whether the values of the movements of the current user are within a range of the values of the movements of the authorized user at a confidence level, wherein the confidence level is determined according to an amount of money in a transaction;
   program instructions, responsive to determining that the values of the movements of the current user are within range of the values of the movements of the authorized user at the confidence level, to send by the NFC device carried by the current user the transaction data from the NFC device to a payment transaction processing system; and
   program instructions, responsive to determining that the values of the movements of the current user are not within range of the values of the movements of the authorized user at the confidence level, to request by the NFC device carried by the current user at least one of biometric data and manual input data as an additional authentication means from the current user of the NFC device.

7. The computer program product of claim 6, further comprising:
program instructions, stored on at least one of the one or more tangible storage devices, to receive by the NFC device carried by the current user the additional authentication means from the current user of the NFC device.

8. The computer program product of claim 6, wherein the biometric data includes facial recognition data, fingerprint scan data, or retinal scan data.

9. The computer program product of claim 6, further comprising:
program instructions, stored on at least one of the one or more tangible storage devices, to update by the NFC device carried by the current user the confidence level over time in response to receiving additional data from the one or more sensors.

10. A near field communication (NFC) device comprising:
one or more sensors, one or more processors, one or more computer-readable tangible storage devices, and program instructions stored on at least one of the one or more storage devices for execution by at least one of the one or more processors, the program instructions comprising:
program instructions to establish by the NFC device a profile comprising values of the movements of an authorized user of the NFC device based on data received from one or more sensors of the NFC device over a first period of time when the NFC device is carried by the authorized user, wherein in the profile the values of the movements of the authorized user include at least one of walking speed of the authorized user, time periods the NFC device carried by the authorized user does not move, gaits of the authorized user, speed of direction changes of the authorized user, acceleration and deceleration rates of the authorized user, and ways the NFC device is carried by the authorized user;
program instructions to, responsive to a request for transaction data, establish a profile comprising values of the movements of the current user of the NFC device based on data received from the one or more sensors of the NFC device over a second period of time when the NFC device is carried by the current user after the first period of time, wherein in the profile the values of the movements of the current user include at least one of walking speed of the current user, time periods the NFC device carried by the current user does not move, gaits of the current user, speed of direction changes of the current user, acceleration and deceleration rates of the current user, and ways the NFC device is carried by the current user;
program instructions to compare by the NFC device carried by the current user the values of the movements of the current user with the values of the movements of the authorized user;
program instructions to determine by the NFC device carried by the current user whether the values of the movements of the current user are within a range of the values of the movements of the authorized user at a confidence level, wherein the confidence level is determined according to an amount of money in a transaction;
program instructions, responsive to determining that the values of the movements of the current user are within range of the values of the movements of the authorized user at the confidence level, to send by the NFC device carried by the current user the transaction data from the NFC device to a payment transaction processing system; and
program instructions, responsive to determining that the values of the movements of the current user are not within range of the values of the movements of the authorized user at the confidence level, to request by the NFC device carried by the current user at least one of biometric data and manual input data as an additional authentication means from the current user of the NFC device.

11. The computer program product of claim 6, wherein the one or more sensors of the NFC device include a global positioning system (GPS) receiver, an accelerometer, or a gyroscope.

12. The near field communication (NFC) device of claim 10, further comprising:
program instructions to receive by the NFC device carried by the current user the additional authentication means from the current user of the NFC device.

13. The near field communication (NFC) device of claim 10, wherein the biometric data includes facial recognition data, fingerprint scan data, or retinal scan data.

14. The near field communication (NFC) device of claim 10, further comprising:
program instructions to update by the NFC device carried by the current user the confidence level over time in response to receiving additional data from the one or more sensors.

15. The near field communication (NFC) device of claim 10, wherein the one or more sensors of the NFC device include a global positioning system (GPS) receiver, an accelerometer, or a gyroscope.

* * * * *